US009572075B2

(12) United States Patent
Li et al.

(10) Patent No.: US 9,572,075 B2
(45) Date of Patent: Feb. 14, 2017

(54) METHOD, APPARATUS, AND COMPUTER PROGRAM PRODUCT FOR PERFORM HANDOVER IN A HETEROGENOUS NETWORK

(71) Applicant: Nokia Technologies Oy, Espoo (FI)

(72) Inventors: Haitao Li, Beijing (CN); Yang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/440,295

(22) PCT Filed: Nov. 9, 2012

(86) PCT No.: PCT/CN2012/084402
§ 371 (c)(1),
(2) Date: May 1, 2015

(87) PCT Pub. No.: WO2014/071618
PCT Pub. Date: May 15, 2014

(65) Prior Publication Data
US 2015/0296431 A1    Oct. 15, 2015

(51) Int. Cl.
*H04W 36/08* (2009.01)
*H04W 36/00* (2009.01)
*H04W 84/04* (2009.01)

(52) U.S. Cl.
CPC ......... *H04W 36/08* (2013.01); *H04W 36/0005* (2013.01); *H04W 36/0066* (2013.01); *H04W 84/045* (2013.01)

(58) Field of Classification Search
None
See application file for complete search history.

(56) References Cited

U.S. PATENT DOCUMENTS

2010/0260096 A1    10/2010    Ulupinar et al.
2011/0044279 A1    2/2011    Johansson et al.
(Continued)

FOREIGN PATENT DOCUMENTS

CN    101646212    2/2010
CN    101841880    9/2010
(Continued)

OTHER PUBLICATIONS

International Search Report and Written Opinion received for corresponding Patent Cooperation Treaty Application No. PCT/CN2012/084402, dated Aug. 15, 2013, 9 pages.
(Continued)

*Primary Examiner* — Faruk Hamza
*Assistant Examiner* — Cassandra Decker
(74) *Attorney, Agent, or Firm* — Nokia Technologies Oy

(57) ABSTRACT

A method, a corresponding apparatus, and a computer program product for performing a handover in a heterogeneous network. The method comprises sending, by a source local area base station, one or more handover requests with respect to an ongoing local area an ongoing local area service to one or more neighbor local area base stations and one or more handover requests with respect to an ongoing wide area service to a wide area base station. The method also comprises receiving one or more handover commands with respect to the ongoing local area service from the one or more neighbor local area base stations and one or more messages from the wide area base station, each message including information regarding one of the one or more neighbor local area base stations. The method additionally comprises selecting, based upon the one or more received handover commands and messages, one of the one or more neighbor local area base stations as a target local area base station for service continuity of at least one of the ongoing
(Continued)

local area service and the ongoing wide area service. With the claimed inventions, the service continuity of at least one of the ongoing local area service and the ongoing wide area service could be maintained and handover can be completed in a seamless manner.

19 Claims, 6 Drawing Sheets

(56) References Cited

U.S. PATENT DOCUMENTS

| | | | |
|---|---|---|---|
| 2011/0045834 A1 | 2/2011 | Kim et al. | |
| 2011/0075633 A1 | 3/2011 | Johansson et al. | |
| 2011/0194533 A1 | 8/2011 | Chen | |
| 2011/0269465 A1 | 11/2011 | Xu et al. | |
| 2011/0319013 A1* | 12/2011 | Jung | H04B 7/2606 455/7 |
| 2012/0002637 A1* | 1/2012 | Adjakple | H04W 36/0055 370/331 |
| 2012/0244864 A1* | 9/2012 | Fujii | H04W 36/0066 455/436 |
| 2012/0315911 A1* | 12/2012 | Han | H04W 36/0061 455/437 |
| 2015/0264609 A1* | 9/2015 | Zhang | H04W 36/0055 455/436 |

FOREIGN PATENT DOCUMENTS

| | | |
|---|---|---|
| WO | 2011068237 | 6/2011 |
| WO | 2013/123643 A1 | 8/2013 |

OTHER PUBLICATIONS

"LTE X2 Handover", NMC Consulting Group, Retrieved on Jul. 22, 2016, Webpage available at: http://www.3glteinfo.com/wp-content/uploads/2013/12/NMC.LTE-X2-Handover.v1.0.pdf.

"MEF", OPASTCO, Retrieved on Jul. 22, 2016, Webpage available at: http://www.google.co.in/url?sa=t&rct=j&q=providing+both+(%22local+services%22%7CX2%7C%22AP%22%7C%22access+point%22)+and+(%22EPS%22%7C%22evolved+packet+system%22%7C%22S1%22)+in+(%22local+area+network%22%7C%22LAN%22)(handover%7Chandoff)&source=web&cd=13&cad=rja&ved=0CCoQFjACOAo&url=http%3A%2F%2Fwww.opastco.org%2Fdoclibrary%2F2481%2FMEF%2520at%2520OPASTCO%25202012v4.

Extended European Search Report received for corresponding European Patent Application No. 12888025.9, dated Jun. 2, 2016, 6 pages.

* cited by examiner

METHOD, APPARATUS, AND COMPUTER PROGRAM PRODUCT FOR PERFORM HANDOVER IN A HETEROGENOUS NETWORK

RELATED APPLICATION

This application was originally filed as PCT Application No. PCT/CN2012/084402 filed Nov. 9, 2012.

FIELD OF THE INVENTION

Embodiments of the present invention generally relate to wireless communication techniques including the 3GPP (the 3rd Generation Partnership Project) LTE (Long Term Evolution) technique. More particularly, embodiments of the present invention relate to a method, an apparatus, and a computer program product for performing a handover in a heterogeneous network.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the specification and claims in this application and is not admitted to be prior art by inclusion in this section.

Various abbreviations that appear in the specification and/or in the drawing figures are defined as below:
AP Access Point
AS Access Stratum
BS Base Station
CN Core Network
CA Carrier Aggregation
DRB Data Radio Bearer
EAP Extensible Authentication Protocol
ECGI E-UTRAN Cell Global Identifier
eNB evolved Node B
EPS Enhanced Packet System
EPC Enhanced Packet Core
E-UTRAN Evolved Universal Terrestrial Radio Access Network
GPRS General Packet Radio Service
GW Gateway
HLR Home Location Register
HSS Home Subscriber Server
IP Internet Protocol
LAN Local Area Network
LTE-LAN/Hi enhanced LTE-based LAN
MME Mobility Management Entity
MSC Mobile Switching Centre
NAS Non Access Stratum
OAM Operations, Administrations and Maintenance
PDU Protocol Data Unit
PDN Packet Data Network
PDCP Packet Data Convergence Protocol
PCI Physical Cell Identifier
RLC Radio Link Control
RNC Radio Network Controller
RRC Radio Resource Control
RRM Radio Resource Management
SRB Signaling Radio Bearer
SN Support Node
UE User Equipment
VLR Visitor Location Register
WAN Wide Area Network As the number of persons using wireless communication in their daily life keeps increasing, high-speed data transmissions have become highly expected to meet the requirements of a multitude of wireless services. It is known that a LAN system is generally capable of providing relatively high speed data services. How to provide local access with a high speed data rate using a wireless communication system, e.g., an LTE system or an EPS, has become a hot topic in the 3GPP and leads to the emergence of a promising LTE-LAN technique.

An LTE-LAN (also referred to as LTE-Hi) technique is a heterogeneous network technique that can be used in a network consisting of an EPS network comprising macro/micro/pico BSs and a LAN comprising wireless APs. The wireless AP herein is also referred to as a local area BS in the present invention and thus is interchangeably used with the local area BS throughout the present specification. In such a heterogeneous network, a UE may have EPS and LTE-Hi connectivity separately or concurrently. In this manner, the LTE-Hi may provide high performance services for wireless communication users with relatively low costs. For example, the UE may have EPS bearer, offloaded EPS bearer and local autonomous bearer services. For a better understanding of embodiments of the present invention, below is an introduction regarding this heterogeneous network with reference to FIG. 1.

FIG. 1 illustrates an exemplary heterogeneous network 100 including an LTE-LAN, in which exemplary network entities and interfaces between these entities are illustrated and embodiments of the present application can be practiced. As shown in FIG. 1, the LTE-LAN applies a new LTE-like radio interface as a "simplified LTE-Uu" interface between the UE and LTE-LAN AP. Due to requirement for less CN involvement, the LTE-LAN network according to certain embodiments of the present invention supports a "stand-alone" mode where the LTE-LAN network is working autonomously by providing a basic wireless broadband access with UE traffic routing to a local LAN/IP network directly from an LTE-LAN AP and to the Internet via a default GW of this LAN/IP network. This autonomous "stand-alone" mode operation is useful especially in the case where overlaying macro network service (also termed a wide area service relative to a local area service in the present invention) coverage, e.g., provided by an "associated" macro eNB (also termed a wide area BS in the present invention) as illustrated in FIG. 1, is missing or has poor quality or poor capabilities relative to what the service would need. The local LAN transport network may include an ordinary Ethernet-based LAN, i.e. IEEE 802.3 as shown in FIG. 1 or any of its modern extensions like Gigabit-Ethernet. In general, this stand-alone LTE-LAN operation resembles existing Wi-Fi network solutions except that the radio interface is using said simplified LTE-Uu interface with LTE procedures. The LTE local radio would use LTE physical layer or any of its extensions (e.g., LTE-Advanced) and LTE protocols with possible simplifications compared to a WAN. The LTE-LAN may additionally include new features specifically designed for the local wireless access.

For the autonomous stand-alone mode operation as discussed above, the LTE-LAN network provides means for UE authentication and authorization to use services provided by the LTE-LAN network. This may be implemented by using similar methods as applied in WLAN (IEEE 802.11i) but modified to carry the authentication protocol messages, e.g. EAP encapsulated into LTE Uu RRC messages. In FIG.

1, there is shown an optional local authentication server that may be a RADIUS server or a diameter server like the one used in enterprise networks.

FIG. 2 illustrates a vertical RRC protocol stack for the LTE-Hi as illustrated in FIG. 1. For a concise purpose, some protocol layers that are necessary but not closely relevant to the embodiments of the present invention are omitted in this example protocol stack. In the illustrated protocol stack, communication entities, such as the UE, the LTE-Hi AP, the associated macro eNB, and the MME, may communicate with one another over corresponding peer layers. Also seen in the protocol stack are EPS RRC and PDCP entities at the associated macro eNB being located on top of local RRC and PDCP entities, i.e., RRC* and PDCP* as identified at the UE and LTE-Hi AP. This protocol arrangement is in a NAS-like style and enables flexible and independent implementation of the local RRC and PDCP functions. Under this protocol arrangement, in order to reuse the current EPS security mechanism, a straightforward approach is to treat the LTE-Hi AP as illustrated in FIGS. 1 and 2 as a subsystem of a macro eNB network (e.g., an EPS network, which is a specific type of a wide area network according to embodiments of the present invention) and inter-AP (a source AP and a target AP) mobility would necessarily involve EPS security key's change based on some parameters (e.g., PCI and a certain frequency) of the target AP. This means that even for UE's inter-AP mobility with a direct X2 interface between APs, the associated macro eNB is involved in the handover preparation and execution.

For an easy and purposeful discussion, reference will be made to FIG. 3 which schematically illustrates a simplified network architecture 300 in which the embodiments of the present invention may be practiced. As illustrated in FIG. 3, the network architecture 300 includes a UE which is being served by a source AP, a potential target AP1, a potential target AP2, and an associated macro eNB (i.e., the wide area BS), wherein the source AP, the potential target AP1 and the potential target AP2 are interconnected via X2 interfaces and each connected with the associated macro eNB via S1' (i.e., simplified S1) interfaces. When the UE becomes increasingly remote from the source AP and move towards the target AP1 or AP2, this inter-AP mobility may bring about some potential problems.

First, the wide area service (e.g., EPS service) may be lost during the handover between APs. In particular, for a single radio mode UE currently working under the coverage of the source AP with both ongoing local service and EPS service, a neighbor AP, e.g. target AP1, is reported to the network side during UE's mobility. For a local service handover, the X2 interface based handover between APs is suitable due to lack of involvement of the macro eNB. In contrast, for an EPS service handover, an S1' interface based handover may be more preferred as the macro eNB is responsible for managing EPS bearers and some EPS security keys whenever update is needed. Normally, the X2 based handover preparation would be faster than the S1' based handover due to shorter latency and route. Thus, it is very likely that the source AP receives the handover ACK (i.e., handover command) from the target AP for the local service handover before any response from the associated macro eNB for the EPS service handover. At this point, if the source AP chooses to forward the handover command to the UE, then the subsequent handover command for the EPS service issued by the associated macro eNB via the source AP might not reach the UE since the UE, at this moment, has already been handed over to the target AP. In this case, the EPS service would definitely be lost during UE's mobility.

Second, a handover collision may arise between the EPS service and local service during the inter-AP handover. In particular, for two RRC modes in the LTE-LAN, the EPS RRC is in charge of EPS bearer's management including configuration and mobility control, and the local RRC is for local bearer's management. These two RRC functions are decoupled in most cases to enable more flexible LAN design and implementation. Since the multi-cell handover preparation feature has already been supported in the existing standard and product, it is likely that the independent EPS RRC and local RRC controls end up with different target cells handover decision. Thus, the handover collision needs to be resolved since the UE can only be handed over to only one target cell.

SUMMARY OF THE INVENTION

The following presents a simplified summary of the present invention in order to provide a basic understanding of some aspects of the present invention. It should be noted that this summary is not an extensive overview of the present invention and that it is not intended to identify key/critical elements of the present invention or to delineate the scope of the present invention. Its sole purpose is to present some concepts of the present invention in a simplified form as a prelude to the more detailed description that is presented later.

To address the problems as discussed before, certain embodiments of the present invention would provide for an efficient way of controlling mobility of UEs in the LTE-Hi-like heterogeneous network such that service continuity can be achieved for at least one of the local area service and the wide area service.

One embodiment of the present invention provides a method. The method comprises sending, by a source local area BS, one or more handover requests with respect to an ongoing local area service to one or more neighbor local area BSs and one or more handover requests with respect to an ongoing wide area service to a wide area BS. The method also comprises receiving one or more handover commands with respect to the ongoing local area service from the one or more neighbor local area BSs and one or more messages from the wide area BS, each message including information regarding one of the one or more neighbor local area BSs. The method additionally comprises selecting, based upon the one or more received handover commands and messages, one of the one or more neighbor local area BSs as a target local area BS for service continuity of at least one of the ongoing local area service and the ongoing wide area service.

Another embodiment of the present invention provides an apparatus. The apparatus comprises means for sending, by a source local area BS, one or more handover requests with respect to an ongoing local area service to one or more neighbor local area BSs and one or more handover requests with respect to an ongoing wide area service to a wide area BS. The apparatus also comprises means for receiving one or more handover commands with respect to the ongoing local area service from the one or more neighbor local area BSs and one or more messages from the wide area BS, each message including information regarding one of the one or more neighbor local area base stations. The apparatus additionally comprises means for selecting, based upon the one or more received handover commands and messages, one of the one or more neighbor local area BSs as a target local area base station for service continuity of at least one of the ongoing local area service and the ongoing wide area service.

A further embodiment of the present invention provides an apparatus. The apparatus comprises at least one processor and at least one memory including computer program instructions. The at least one memory and computer program instructions are configured to, with the at least one processor, cause the apparatus at least to send, by a source local area BS, one or more handover requests with respect to an ongoing local area service to one or more neighbor local area BSs and one or more handover requests with respect to an ongoing wide area service to a wide area BS. The at least one memory and computer program instructions are also configured to, with the at least one processor, cause the apparatus at least to receive one or more handover commands with respect to the ongoing local area service from the one or more neighbor local area BSs and one or more messages from the wide area BS, each message including information regarding one of the one or more neighbor local area BSs. The at least one memory and computer program instructions are additionally configured to, with the at least one processor, cause the apparatus at least to select, based upon the one or more received handover commands and messages, one of the one or more neighbor local area BSs as a target local area BS for service continuity of at least one of the ongoing local area service and the ongoing wide area service.

One embodiment of the present invention provides a computer program product, comprising at least one computer readable storage medium having a computer readable program code portion stored thereon. The computer readable program code portion comprises program code instructions for sending, by a source local area BS, one or more handover requests with respect to an ongoing local area service to one or more neighbor local area BSs and one or more handover requests with respect to an ongoing wide area service to a wide area BS. The computer readable program code portion also comprises program code instructions for receiving one or more handover commands with respect to the ongoing local area service from the one or more neighbor local area BSs and one or more messages from the wide area BS, each message including information regarding one of the one or more neighbor local area BSs. The computer readable program code portion also comprises program code instructions for selecting, based upon the one or more received handover commands and messages, one of the one or more neighbor local area BSs as a target local area BS for service continuity of at least one of the ongoing local area service and the ongoing wide area service.

With the embodiments of the present invention, by selection or coordination operation as performed at the source local area BS (e.g., source AP), the handover collision that might take place during the handover between local area BSs could be resolved. Further, the service continuity of at least one of the ongoing local area service and the ongoing wide area service could be maintained and handover can be completed in a seamless manner, thereby achieving a better user experience.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION OF EMBODIMENTS

Certain embodiments of the present invention intend to address the handover issues for both local area services and wide area services (e.g., EPS services) in the LTE-LAN. Particularly, during the UE's inter-AP mobility, in order to prevent the source AP from forwarding the local area service handover command too early to the UE, which might take the risk of missing the subsequent EPS service handover command, the macro eNB may indicate to the source AP whether the EPS RRC message transmitted over the LTE-LAN is an EPS service handover command or not. The source AP should take both local area service continuity and EPS service continuity into account when forwarding the handover command to the UE. Additionally, the macro eNB may also indicate to the source AP which target AP is for the EPS service handover. This information will be used by the source AP to compare with the target AP whose indication is included in the received local area handover command, to ensure that the UE can end up with a single target AP meanwhile maintaining continuity for at least one of the local area service and EPS service after these EPS and local area handovers. In this manner, a proper and single target AP can be selected, thereby avoiding the handover collision and service discontinuity as discussed above.

Figure 1:
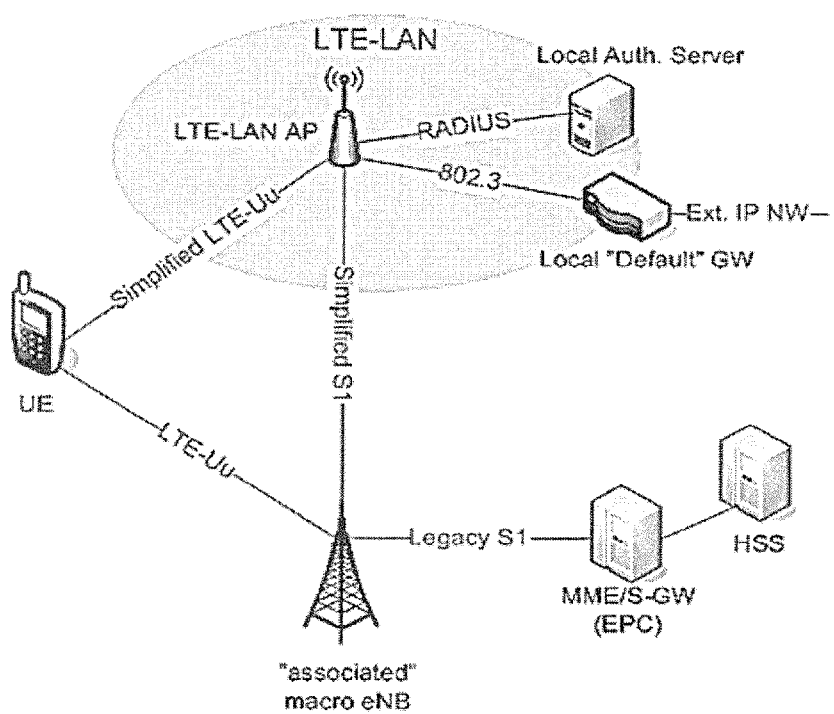
FIG. 1 illustrates an exemplary heterogeneous network including an LTE-LAN network and a legacy LTE or EPS network in which the embodiments of the present invention can be practiced.
Figure 2:
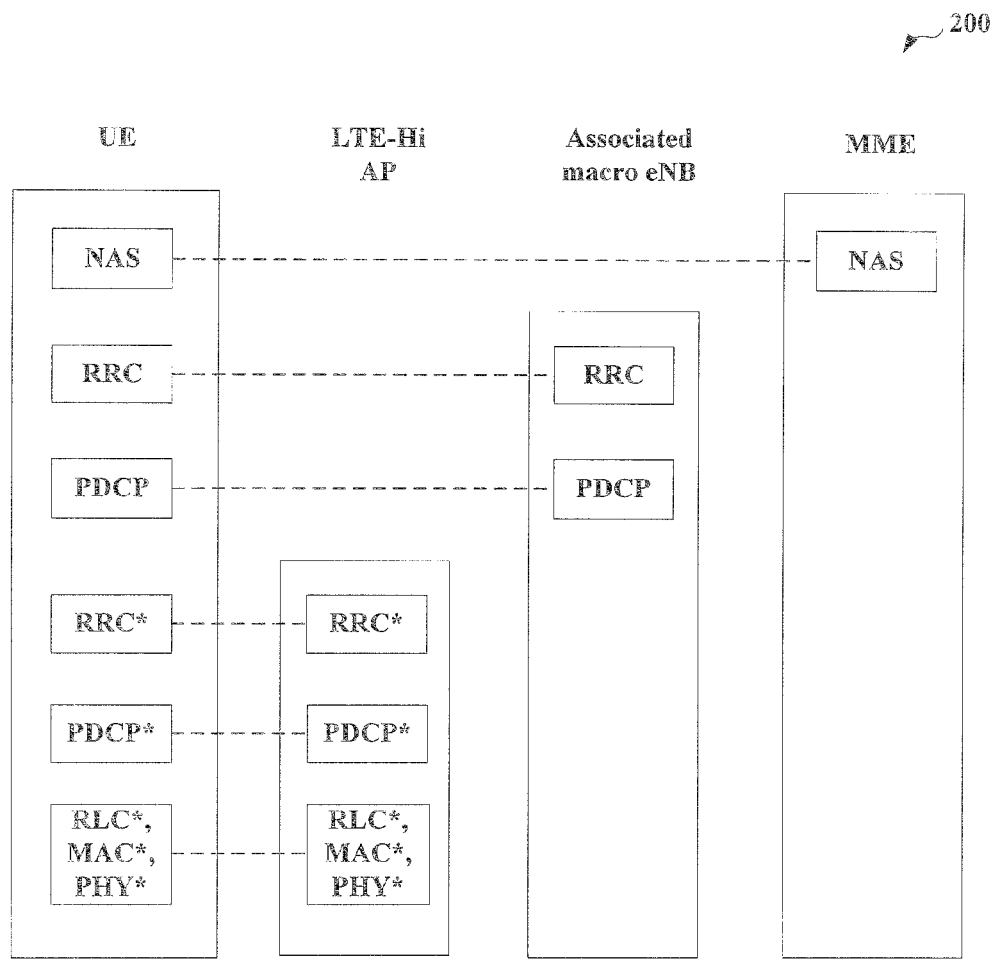
FIG. 2 schematically illustrates a vertical C-plane protocol stack for the heterogeneous network as illustrated in FIG. 1.
Figure 3:
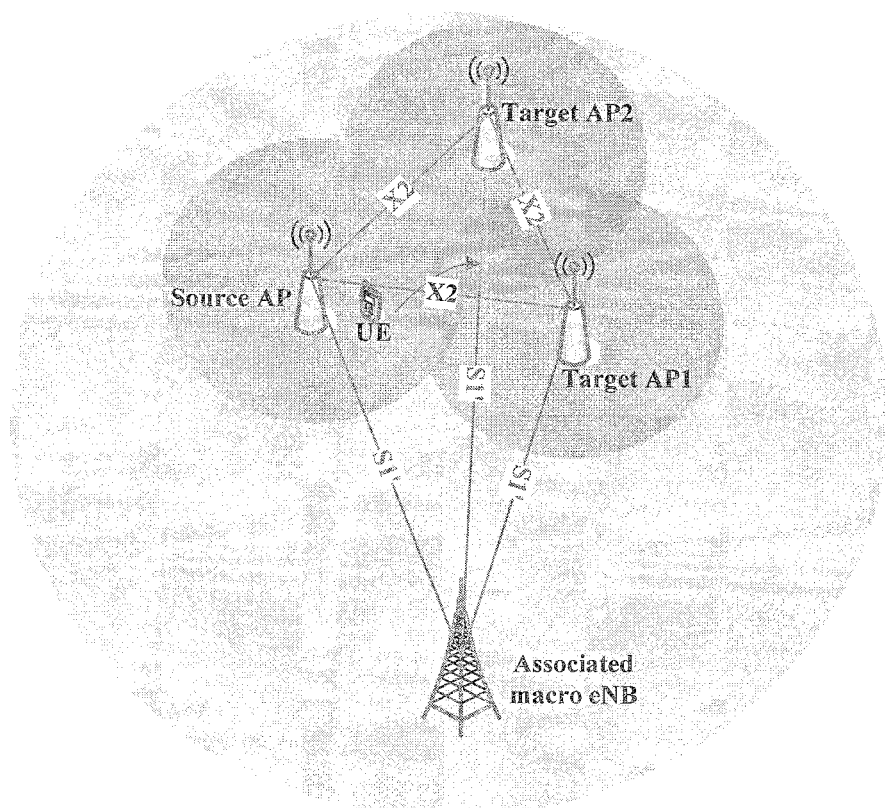
FIG. 3 schematically illustrates a simplified network architecture in which the embodiments of the present invention may be practiced.

Since the heterogeneous network, its possible protocol stack and its simplified form, in which the embodiments of the present invention may be practiced, have been described respectively with reference to FIGS. 1-3, further descriptions are omitted herein for a simplifying purpose.

Figure 4:
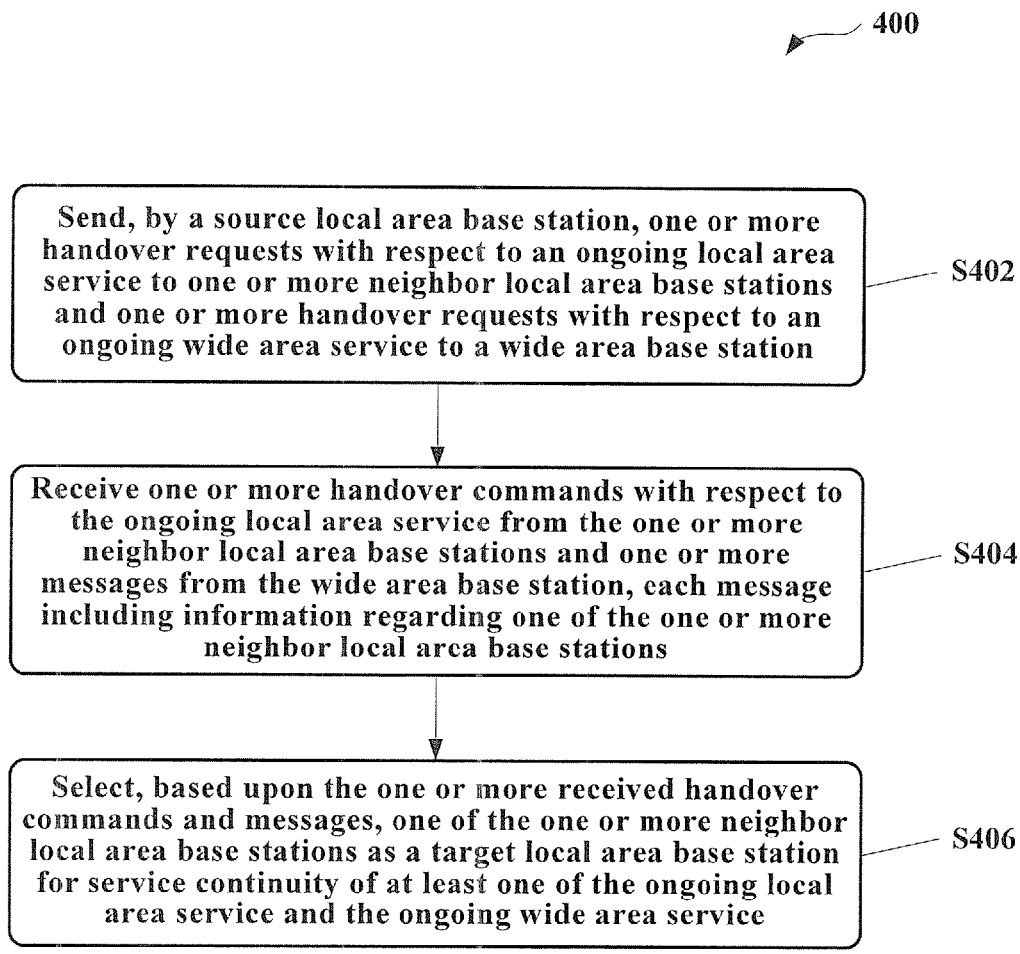
FIG. 4 is a flow chart schematically illustrating a method for performing a handover in a heterogeneous network from a perspective of a source local area BS (e.g., a source AP) according to an embodiment of the present invention.

FIG. 4 is a flow chart schematically illustrating a method 400 for performing a handover in a heterogeneous network from a perspective of a source local area BS (e.g., a source AP) according to an embodiment of the present invention. As illustrated in FIG. 4, at step S402, the method 400 sends, by a source local area BS, one or more handover requests with respect to an ongoing local area service to one or more neighbor local area BSs (e.g., the potential target AP1 and target AP2 in FIG. 3) and one or more handover requests with respect to an ongoing wide area service to a wide area BS (e.g., the associated macro eNB in FIG. 3). These one or more handover requests may be triggered upon measurement reports as sent by the UE to the source AP. In some embodiments, the ongoing wide area service is established between a UE served by the source local area BS and the wide area BS via the source local area BS.

Then, the method 400 proceeds to step S404, at which the method 400 receives one or more handover commands with respect to the ongoing local area service from the one or more neighbor local area BSs and one or more messages from the wide area BS, each message including information regarding one of the one or more neighbor local area BSs. Although not shown, in some embodiments, the one or more handover commands and messages are received within a predetermined time period. By setting a predetermined time period, e.g., a timer, on the one hand, it would be easy and more likely to receive multiple handover commands and messages and thus an optimal target local area BS could be selected therefrom. On the other hand, the time taken to receive one or more handover commands and messages can be limited to the extent that the handover procedure may not be overly delayed. In some embodiments, the one or more handover commands with respect to the ongoing local area service are encrypted using corresponding local security keys.

In some embodiments, the one or more messages are downlink NAS transport messages, each of which includes a ciphered handover command with respect to the ongoing wide area service and an explicit indication indicative of one of the one or more neighbor local area BSs. This arrangement is mainly ascribed to the following fact. Normally, when a macro eNB delivers an EPS RRC message, it ciphers this EPS RRC message using an EPS security mechanism and then sends this ciphered message to the local area AP or BS via the S1' interface. The local area AP is not capable of deciphering the ciphered EPS RRC message due to the lack of EPS keys and algorithm, and thus cannot identify whether this message is an EPS handover command. In view of this, the embodiments of the present invention introduce an explicit indication indicative of one or more neighbor local area APs. The explicit indication is not ciphered but transmitted as a visible IE from the local area AP point of view. By indicating the neighbor local area APs in relation to the handover, it would be easy for the source local area AP to determine that the received message includes an EPS handover command and which local area AP is selected by the macro eNB for the EPS service handover. Additionally or alternatively, it may be more straightforward to define one bit IE to indicate that this message includes an EPS handover command and add other IE(s) to indicate one or more neighbor local area APs in the downlink NAS transport message.

Upon receipt of the one or more handover commands with respect to the ongoing local service and one or more messages from the wide area BS, the method 400 advances to step S406, at which the method 400 selects, based upon the one or more received handover commands and messages, one of the one or more neighbor local area BSs as a target local area BS for service continuity of at least one of the ongoing local area service and the ongoing wide area service.

In some embodiments, the method 400 selects the target local area BS according to one or more predetermined criteria. In some other embodiments, the one or more predetermined criteria include one or more of a service priority, a service preference, and quality of service. For example, if no common local area BS can be determined from the one or more handover commands and messages within some time period, then one of the ongoing local area service and the ongoing wide area service would have to be temporarily interrupted or even be rejected. For instance, for the service preference, if the ongoing local area service is preferred relative to the ongoing wide area service, then the local area BS whose handover command is first received would be selected as the target local area BS and the local area service may be smoothly handed over to the new serving local area BS. As for the ongoing wide area service, it would be discontinued and may be reestablished later with any appropriate wide area BS.

Similarly, if the ongoing wide area service is more important than the ongoing local area service, then the target local area BS as indicated by the wide area BS in downlink NAS transport message would play a role as a new serving local area BS and thus the ongoing local area service would be discontinued. Again, the target local area BS may be evaluated and selected based upon the quality of service. The higher the quality of service is, the higher the likelihood of the service continuity being maintained would be. Of course, when a common neighbor local area BS exists, then the ongoing local area service and the ongoing wide area service would be seamlessly handed over thereto. In other words, the method 400 selects one of neighbor local area BSs whose information are included both in the one or more received handover commands and messages as a target local BS. In this way, the ongoing local area service and the ongoing wide area service would not be interrupted and can be kept continued after the handover.

In some embodiments, the method 400 further comprises forming a final handover command with respect to the target local area BS and sends the final handover command to a UE served by the source local area BS for handing over the UE to the target local BS.

With the method 400 and its multiple variants and extensions as discussed in the above embodiments, the handover latency and service continuity during the inter-AP handover would be efficiently improved and thereby a better user experience could be achieved.

Figure 5:
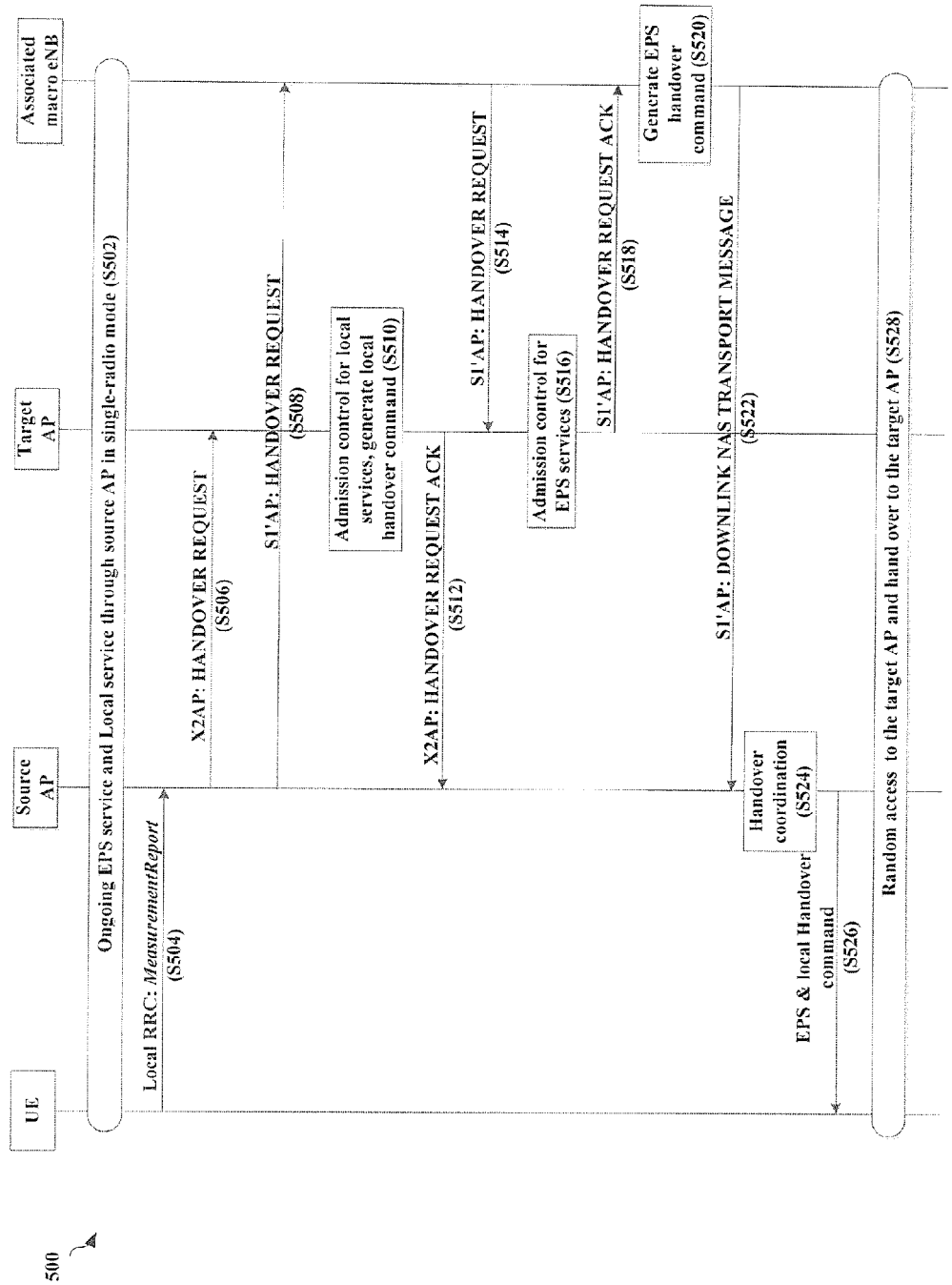
FIG. 5 is an exemplary signaling flow of a method for performing a handover in a heterogeneous network according to another embodiment of the present invention.

FIG. 5 is an exemplary signaling flow of a method 500 for performing a handover in a heterogeneous network according to another embodiment of the present invention. As illustrated in FIG. 5, at step S502, a UE is working in a single radio mode under the source AP with an ongoing EPS service (i.e., wide area service) via the associated macro eNB to the EPC and an ongoing local area service via the source AP to the local server. During its movement and with the lapse of time, the UE may become increasingly remote from the source AP and close to the target AP. Due to this, the UE sends, at step S504, a measurement report regarding the target AP to the source AP in which case the inter-AP handover procedure might be triggered. Upon receipt of the measurement report regarding the target AP, the source AP may determine that it is time to hand over the UE to the target AP and then it, at step S506, sends a handover request with respect to the ongoing local area service to the target AP via the X2 interface therebetween. In the meantime, the source AP, at step S508, sends a handover request with respect to the ongoing EPS service to the associated macro eNB. Upon receiving the handover request with respect to the ongoing local area service, the target AP may perform the admission control for the local area service. For example, the target AP may perform admission control based upon the requested QoS requirements for local services and generate a local handover command at step S510. Thereafter, the target AP will directly feed back, at step S512, a handover request ACK (i.e., a handover command) to the source AP through the X2 interface, wherein the handover request ACK includes configurations of those accepted bearers together with other radio resource configurations. The handover command herein may only carry local bearer information and use delta-signaling based upon the configuration used at the source AP side.

At step S514, the associated macro eNB sends the handover request to the target AP via an S1' interface therebetween. Upon receiving this handover request, the target AP performs admission control for the EPS service at step S516. For example, the target AP may select which EPS DRBs are accepted in the admission control. After that, the target AP sends a handover request ACK to the associated macro eNB at step S518. Based upon the received handover request ACK, the associated macro eNB generates, at step S520, an EPS handover command which includes information regarding the target AP and is ciphered with the EPS security keys. Then, the associated macro eNB may encapsulate this ciphered EPS handover command and an explicit indication indicative of the target AP as discussed before into a downlink NAS transport message and send this message over the EPS RRC to the source AP via the S1' interface at step S522. The indication herein may include information regarding frequency, PCI and ECGI information.

After receiving the local handover command and the downlink NAS transport message, the source AP may read the information regarding target AP. Regarding the local handover command, the source AP can decipher the local handover command using the local security keys. Regarding the downlink NAS transport message, the source AP can only interpret the explicit indication and thereby know which AP is selected by the associated macro eNB. On this basis, the source AP performs handover coordination at step S524, and determines whether the target AP is a proper AP for serving the UE. For example, if the source AP finds that the target AP is included in both the local handover command and the downlink NAS transport message, it may select the target AP as a final target AP. Once the target AP is determined, the source AP sends the local and EPS handover commands to the UE at step S526. Thereafter, the UE may initiate a random access procedure so that it can be handed over the target AP at step S528.

It should be noted that, for a simplifying purpose, FIG. 5 only depicts one target AP and there may be multiple neighbor APs in the vicinity of the UE. Thus, the source AP may send a plurality of local handover requests to these APs and then receive more than one local handover command from these APs. Likewise, the source AP may receive multiple downlink NAS transport messages from the associated macro eNB. Under this circumstance, the source AP would make a decision among these neighbor APs regarding which one of the neighbor APs would be most suitable for the UE. As noted before, the source AP may select a neighbor AP as the target AP if this neighbor AP meets the criteria regarding the service priority, service preference or quality of service. In case a handover collision occurs, the source AP may have two options to proceed with. One option is that it can wait (within some pre-defined timer) for subsequently generated handover commands due to multiple cell preparation. The other option is that it decides to discard one of handover commends based upon some pre-defined criteria or higher layer indications. In case that an EPS handover command is discarded, e.g., due to the expiration of a pre-defined timer, the source AP may report this failure to the associated macro eNB and, as a consequence, only the ongoing local area service would be maintained in this inter-AP handover.

Figure 6:
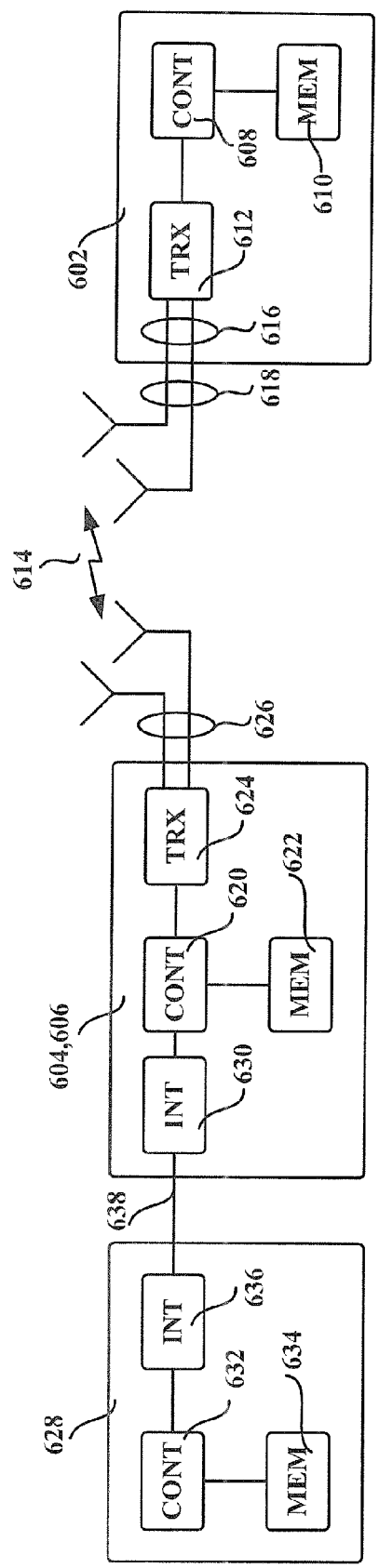
FIG. 6 is a simplified schematic block diagram illustrating apparatuses according to embodiments of the present invention.

FIG. 6 is a simplified schematic block diagram illustrating apparatuses according to an embodiment of the present invention. As illustrated in FIG. 6, a UE 602 is located in the coverage of a radio network node 604 or 606 and is configured to be in connection with the radio network node 604 or 606. The UE 602 comprises a controller 608 operationally connected to a memory 610 and a transceiver 612. The controller 608 controls the operation of the UE 602. The memory 610 is configured to store software and data. The transceiver 612 is configured to set up and maintain a wireless connection 614 to the radio network node 604 or 606. The transceiver 612 is operationally connected to a set of antenna ports 616 connected to an antenna arrangement 618. The antenna arrangement 618 may comprise a set of antennas. The number of antennas may be one to four, for example. The number of antennas is not limited to any particular number. The UE 602 may also comprise various other components, such as a user interface, camera, and media player. They are not displayed in the figure due to simplicity.

The radio network node 604 or 606, such as an LTE base station (or eNB) or LTE-LAN AP included in an eLAN, comprises a controller 620 operationally connected to a memory 622, and a transceiver 624. The controller 620 controls the operation of the radio network node 604 or 606. The memory 622 is configured to store software and data. The transceiver 624 is configured to set up and maintain a wireless connection to the UE 602 within the service area of the radio network node 604 or 606. The transceiver 624 is operationally connected to an antenna arrangement 626. The antenna arrangement 626 may comprise a set of antennas. The number of antennas may be two to four, for example. The number of antennas is not limited to any particular number. The radio network node 604 or 606 may be operationally connected (directly or indirectly) to another CN or LAN network element 628 of the communication system, such as an RNC, an MME, an MSC server (MSS), an MSC, an RRM node, a gateway GPRS support node, an OAM node, an HLR, a VLR, a serving GPRS support node, a GW, and/or a server, via an interface 630. The network node 628 comprises a controller 632 operationally connected to a memory 634, and an interface 636. The controller 632 controls the operation of the network node 628. The memory 634 is configured to store software and data. The interface 636 is configured to connect to the radio network node 604 or 606 via a connection 638. The embodiments are not, however, restricted to the network given above as an example, but a person skilled in the art may apply the solution to other communication networks provided with the necessary properties. For example, the connections between different network elements may be realized with IP connections.

Although the apparatus 602, 604, 606, or 628 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communication system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, a communicator, a tablet or a pad.

The apparatus 602, 604, 606, or 628 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 610, 622, or 634 may include volatile and/or non-volatile memory and typically stores content, data, or the like. For example, the memory 610, 622, or 634 may store computer program code such as software applications (for example for selecting a proper target local area BS for the UE such that the service continuity of at least one of the local area service and wide area service could be maintained) or operating systems, information, data, content, or the like for a processor to perform steps associated with operation of the apparatus 602, 604, 606 or 628 in accordance with embodiments. The memory may be, for example, a random access memory (RAM), a hard drive, or other fixed data memories or storage devices. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   sending, by a source local area base station, one or more handover requests with respect to an ongoing local area service to one or more neighbor local area base stations and one or more handover requests with respect to an ongoing wide area service to a wide area base station;
   receiving one or more handover commands with respect to the ongoing local area service from the one or more neighbor local area base stations and one or more messages from the wide area base station, each message including information regarding one of the one or more neighbor local area base stations; and
   selecting, based upon the one or more received handover commands and messages, one of the one or more neighbor local area base stations as a target local area base station for service continuity of at least one of the ongoing local area service and the ongoing wide area service.

2. The method as recited in claim 1, wherein the one or more handover commands and messages are received within a predetermined time period.

3. The method as recited in claim 1, wherein the one or more messages are downlink non access stratum messages each of which includes a ciphered handover command with respect to the ongoing wide area service and an explicit indication indicative of one of the one or more neighbor local area base stations.

4. The method as recited in claim 1, wherein the selecting comprising selecting the target local area base station according to one or more predetermined criterions.

5. The method as recited in claim 4, wherein the one or more predetermined criterions include one or more of a service priority, a service preference, and quality of service.

6. The method as recited in claim 1, wherein the ongoing wide area service is established between a user equipment served by the source local area base station and the wide area base station via the source local area base station.

7. The method as recited in claim 1, wherein the one or more commands with respect to the ongoing local area service are ciphered using corresponding local security keys.

8. The method as recited in claim 1, wherein the selecting comprises selecting one of the one or more neighbor local area base stations whose information is included in the one or more received handover commands and messages as a target local base station for service continuity of the ongoing local area service and the ongoing wide area service.

9. The method as recited in claim 1, further comprising:
   forming a final handover command with respect to the target local area base station; and
   sending the final handover command to a user equipment served by the source local area base station for handing over the user equipment to the target local base station.

10. An apparatus, comprising:
    at least one processor; and
    at least one memory including computer program instructions,
    wherein the at least one memory and computer program instructions are configured to, with the at least one processor, cause the apparatus at least to:
    send one or more handover requests with respect to an ongoing local area service to one or more neighbor local area base stations and one or more handover requests with respect to an ongoing wide area service to a wide area base station;
    receive one or more handover commands with respect to the ongoing local area service from the one or more neighbor local area base stations and one or more messages from the wide area base station, each message including information regarding one of the one or more neighbor local area base stations; and
    select, based upon the one or more received handover commands and messages, one of the one or more neighbor local area base stations as a target local area base station for service continuity of at least one of the ongoing local area service and the ongoing wide area service.

11. The apparatus as recited in claim 10, wherein the one or more handover commands and messages are received within a predetermined time period.

12. The apparatus as recited in claim 10, wherein the one or more messages are downlink non access stratum messages each of which includes a ciphered handover command with respect to the ongoing wide area service and an explicit indication indicative of one of the one or more neighbor local area base stations.

13. The apparatus as recited in claim 10, wherein the apparatus is configured to select the target local area base station according to one or more predetermined criterions.

14. The apparatus as recited in claim 13, wherein the one or more predetermined criterions include one or more of a service priority, a service preference, and quality of service.

15. The apparatus as recited in claim 10, wherein the ongoing wide area service is established between a user equipment served by the source local area base station and the wide area base station via the source local area base station.

16. The apparatus as recited in claim 10, wherein the one or more commands with respect to the ongoing local area service are ciphered using corresponding local security keys.

17. The apparatus as recited in claim 10, wherein the apparatus is configured to select one of the one or more neighbor local area base stations whose information is included in the one or more received handover commands and messages as a target local base station for service continuity of the ongoing local area service and the ongoing wide area service.

18. The apparatus as recited in claim 10, wherein the apparatus is further caused to:
    form a final handover command with respect to the target local area base station; and
    send the final handover command to a user equipment served by the apparatus for handing over the user equipment to the target local base station.

19. A computer program product, comprising at least one non-transitory computer readable storage medium having a computer readable program code portion stored thereon, the computer readable program code portion comprising:
    program code instructions for sending, by a source local area base station, one or more handover requests with respect to an ongoing local area service to one or more neighbor local area base stations and one or more handover requests with respect to an ongoing wide area service to a wide area base station;
    program code instructions for receiving one or more handover commands with respect to the ongoing local area service from the one or more neighbor local area base stations and one or more messages from the wide area base station, each message including information regarding one of the one or more neighbor local area base stations; and
    program code instructions for selecting, based upon the one or more received handover commands and messages, one of the one or more neighbor local area base stations as a target local area base station for service continuity of at least one of the ongoing local area service and the ongoing wide area service.

* * * * *